May 18, 1926.

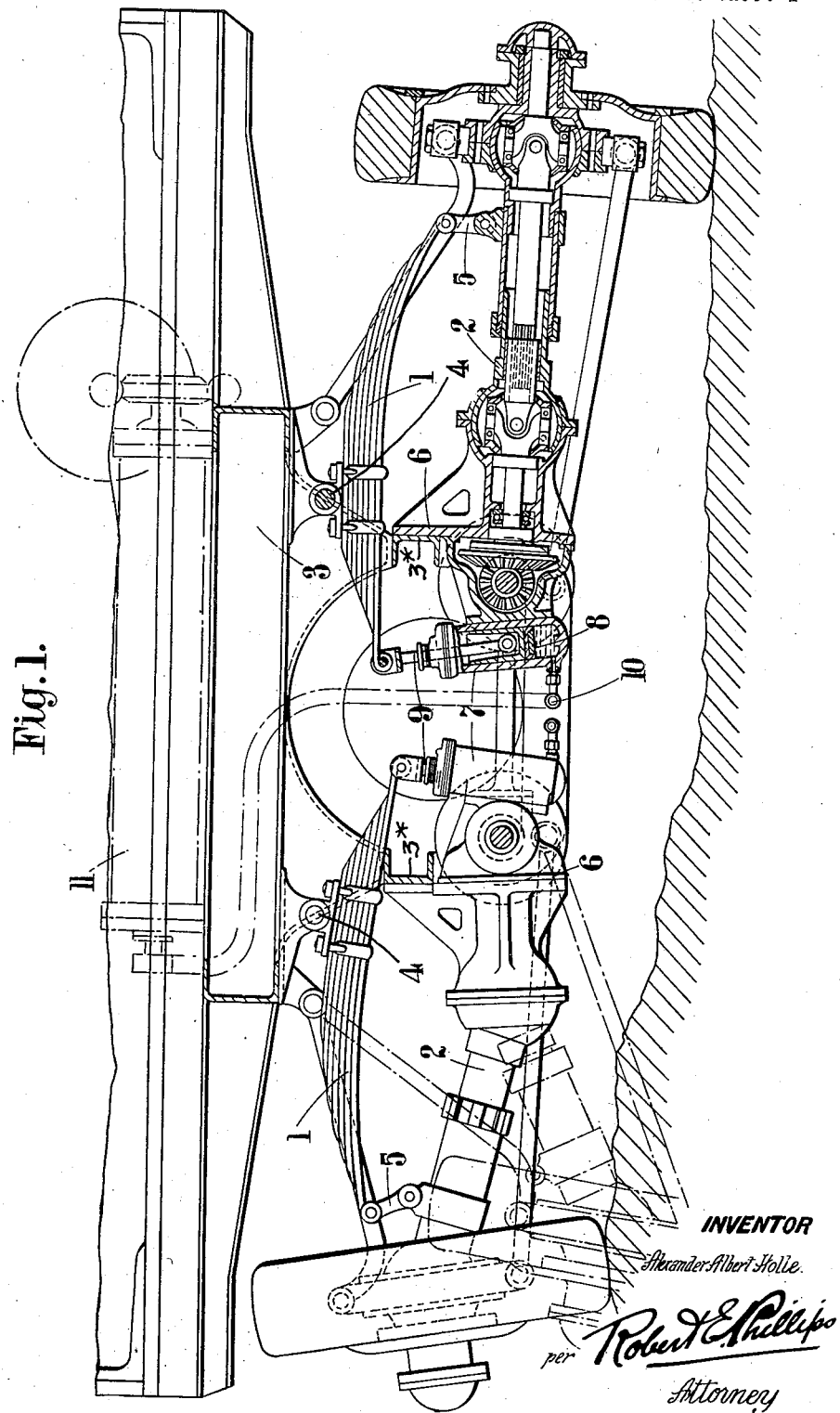

A. A. HOLLE 1,585,097

SUSPENSION OF MOTOR ROAD VEHICLES

Filed May 9, 1924

INVENTOR
Alexander Albert Holle
per Robert E. Phillips
Attorney.

Patented May 18, 1926.

1,585,097

UNITED STATES PATENT OFFICE.

ALEXANDER ALBERT HOLLE, OF PADDINGTON, LONDON, ENGLAND.

SUSPENSION OF MOTOR ROAD VEHICLES.

Application filed May 9, 1924. Serial No. 712,158.

This invention relates to the suspension of motor road vehicles and has for its object to maintain the tension of the springs practically constant throughout the permissible range of movement of the wheels with the object of protecting the chassis against excessive strains.

I attain this end by substituting for one of the inextensible shackles employed for coupling the ends of each of the springs to the underframe of the vehicle, a yielding or elastic coupling which is in hydraulic connection with a common adjustable spring-loaded accumulator cylinder.

In the accompanying drawing which illustrates this invention:—

Fig. 1 is a view in end elevation showing the application of this invention to a chassis in which each pair of road wheels are mounted on independent half axles and are adapted to be employed both for driving and steering purposes.

Throughout the views similar parts are marked with like numerals of reference.

Figure 3:
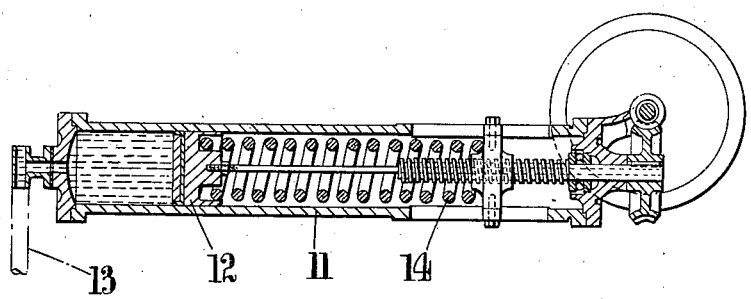
Figure 2:
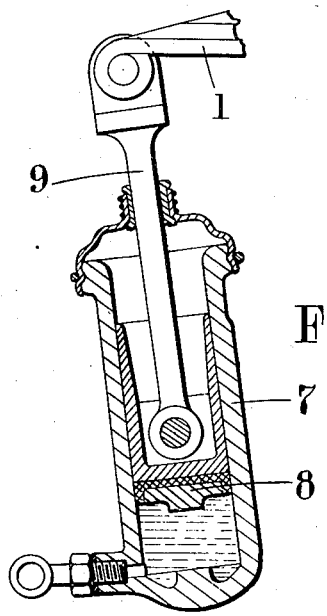
Fig. 2 is a view in sectional elevation—on an enlarged scale—of one of the variable coupling devices, and, Fig. 3 is a view in sectional elevation—on an enlarged scale—of the elastic cushion.

Referring to Figs. 1 and 2 the laminated spring 1 supporting the weight on each half axle 2 is attached to the frame 3 of the undercarriage by a pivot 4, one end of said spring being coupled to the axle 2 as near to its outer end as possible or convenient by a shackle 5. The other end of the spring 1 is connected by a coupling of variable length to a bracket 6 mounted on a subframe 3* of the main frame 3 of the undercarriage, through the bracket. This coupling of variable length consists of a cylinder 7 carried by the bracket 6 and a piston 8 connected through its rod 9 with the spring 1.

The cylinders 7 of the couplings are each in hydraulic connection with an accumulator cylinder 11 through pipes 10 and 13 only one of the latter being shown in the drawing. The pipes 13 are also in communication with a power driven pump—not shown in the drawing—for supplying the hydraulic system, with fluid under pressure by-pass or relief valve being provided in the well known manner for regulating the pressure in said system. The accumulator has a spring-loaded piston 12 the elasticity of the loading spring 14 being capable of being varied by means of any form of hand operated mechanism.

Alternatively to using a common accumulator cylinder a separate one may be employed for each hydraulic cylinder or a separate accumulator cylinder may be employed for the hydraulic cylinders of the springs on either side of the chassis.

The diameter of the accumulator cylinder is materially greater than the aggregate diameters of the hydraulic cylinders of all of the yielding couplings so that the oil passing into it from the cylinders of said yielding couplings will produce a minimum movement of its piston and therefore of its loading spring.

The underlying principle of this invention is that small inequalities in the road surface which are rapidly surmounted are absorbed by the flexing of the suspension springs in the usual way owing to a small amount of lag in the oil systems, while large irregularities in the road surface, in which time is a factor which would allow the suspension springs to transmit the stresses to the frame of the undercarriage locally, are cushioned by the action of the elastic coupling devices.

In action when any one of the road wheels is raised or lowered by meeting obstacles at a rate sufficiently slow to stress the frame through the increased tension on the suspension spring the oil in the hydraulic cylinder of the yielding variable coupling is forced into the accumulator cylinder which being of a larger diameter will absorb the oil passing out of the hydraulic cylinder without causing much movement of the piston of the accumulator cylinder and little travel of the loading spring with the result that the tension of said loading spring and consequently the pressure of the oil will not be materially increased and the tension of the suspension spring will not be appreciably varied during the whole of the upward and downward movement of the road wheel.

The hand adjustment of the spring 14 loading the piston 8 of the accumulator cylinder provides a means of varying the tension of same to the load of the vehicles so as to ensure the entire travel of the wheel being available under all conditions of loading and it also enables the wheels on either side of the vehicle to be raised or lowered to facilitate loading or unloading.

What I claim is:—

1. In a suspension for motor road vehicles a pair of divided axles, a spring arranged in parallel relation to each half axle and pivoted median to its length to the underframe of the vehicle, an inextensible coupling connecting one end of each spring to its half axle and a yielding coupling connecting the other end of each spring to said underframe said yielding coupling comprising an hydraulic cylinder mounted on a subframe carried by the underframe and a piston working in said cylinder connected to the end of the spring.

2. In a suspension for motor road vehicles a pair of divided axles, a spring arranged in parallel relation to each half axle and pivoted median to its length to the underframe of the vehicle one end of each spring being connected to its half axle by an inextensible coupling and the other end of each spring being connected indirectly to the underframe by a compressible coupling which comprises an hydraulic cylinder mounted on a subframe carried by the underframe and a piston working in said cylinder carried by the end of the spring, and an accumulator cylinder with which each of the hydraulic cylinders is in hydraulic connection.

3. In a suspension for motor road vehicles a pair of divided axles, a spring arranged in parallel relation to each half axle and pivoted median to its length to the underframe of the vehicle, an inextensible coupling connecting one end of each spring to its half axle and a yielding coupling connecting the other end of each spring to said underframe said yielding coupling comprising an hydraulic cylinder mounted on a subframe carried by the underframe and a piston working in said cylinder connected to the end of the spring, an adjustable spring-loaded accumulator cylinder with which each of said hydraulic cylinders is in hydraulic connection, and means for varying the spring load on said accumulator.

4. A suspension for motor road vehicles comprising a divided axle, a spring arranged in parallel relation to each half axle and pivoted median to its length to the underframe of the vehicle, an inextensible coupling connecting one end of each spring to its half axle and an elastic coupling connecting the other end of each spring to said underframe said elastic coupling comprising an hydraulic cylinder mounted on a subframe carried by the underframe and a piston working in said cylinder connected to the end of the spring, and an adjustable spring-loaded accumulator cylinder with which said two hydraulic cylinders are in hydraulic connection the volumetric capacity of said accumulator cylinder being materially greater than that of the two hydraulic cylinders.

ALEXANDER ALBERT HOLLE.